April 23, 1968     J. T. KIRKLAND     3,379,343
SLICED BREAD DISPENSER
Filed Dec. 16, 1966
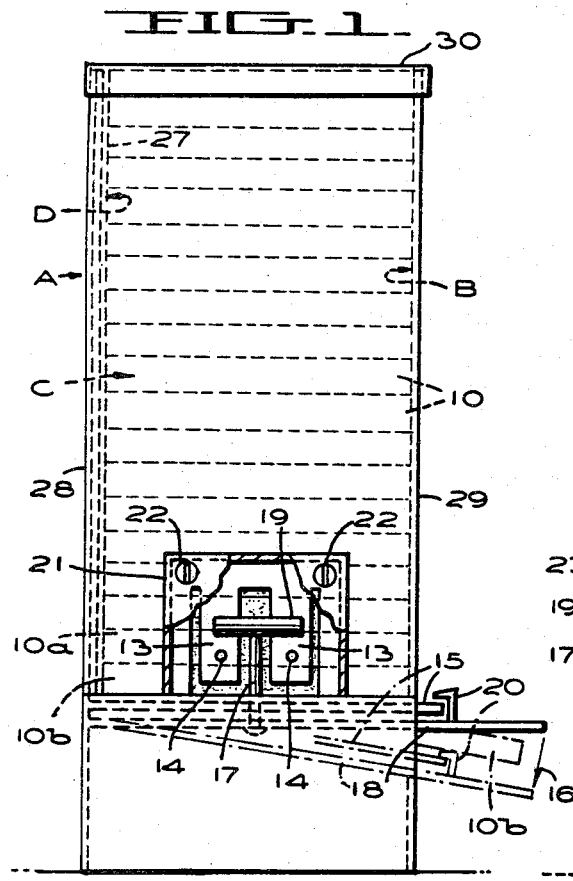
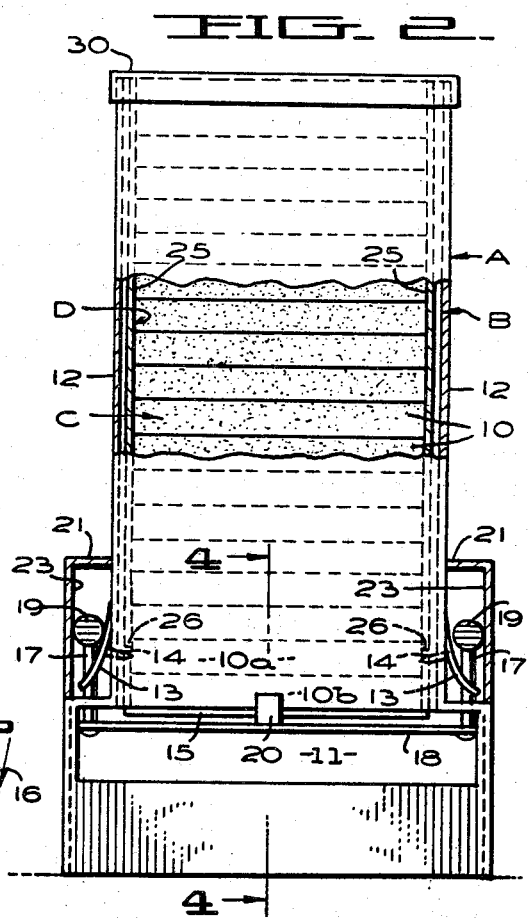
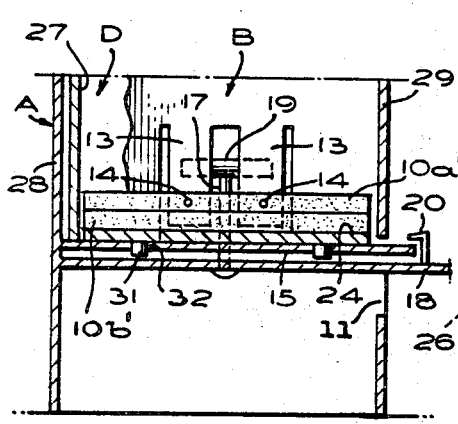
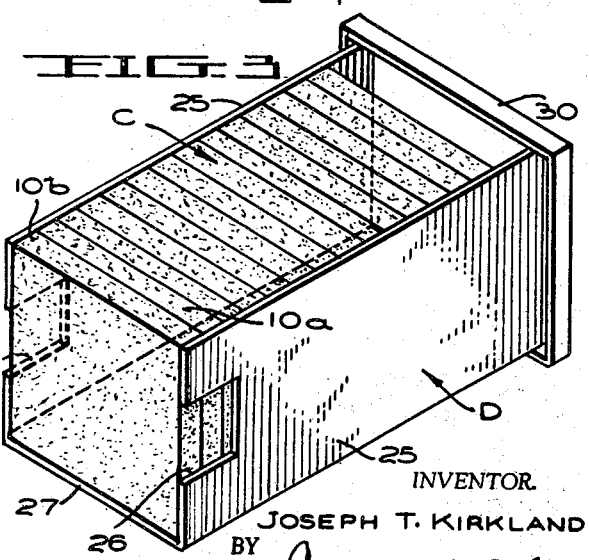
INVENTOR.
JOSEPH T. KIRKLAND
BY Joseph F. Cole
ATTORNEY

United States Patent Office 3,379,343
Patented Apr. 23, 1968

3,379,343
SLICED BREAD DISPENSER
Joseph T. Kirkland, 145 N. Kingston St.,
San Mateo, Calif. 94401
Filed Dec. 16, 1966, Ser. No. 602,378
3 Claims. (Cl. 221—251)

ABSTRACT OF THE DISCLOSURE

A sliced bread dispenser having a compartment for holding a loaf of bread, with the slices being stacked one above the other, and an operating plate for discharging the lowermost slice of bread, while temporarily arresting downward movement of the remaining slices in the stack.

Background of the invention (1) Field of the invention: The present invention relates to improvements in a sliced bread dispenser that is operable for dispensing slices of bread of various thicknesses, and a trough for use in loading the dispenser with a loaf of bread. Novel means are used for dispensing the slices one at a time.

(2) Description of the prior art: Sliced bread dispensers have been provided in the art, and this invention pertains to specific improvements and embodiment.

Summary

It is proposed in this invention to provide a housing having a compartment for holding a loaf of sliced bread, with a swingable platform positioned at the bottom of the compartment so as to have the lowermost slice of bread rest thereon, this platform being located so that the lowermost slice will slide through a dispensing opening, when the platform is moved. Moreover, a swingable operating plate is provided for actuating pins that will engage with the second lower slice of bread to hold the latter in place during discharge of the lowermost slice of bread, the pins effecting a holding action on the second lower slice prior to movement of the lowermost slice from the dispenser.

Also, it is proposed to provide a sliced bread dispenser having an insertable filler plate that will permit thin slices of bread to be engaged by the pins, and a trough may be used for receiving the loaf of bread and inserting the loaf into the housing, with the trough remaining therein, but without interfering with the operation of the pins.

Brief description of the drawings

For a better understanding of the invention, reference should be had to the accompanying drawing, forming part of this specification, in which:

FIG. 1 is a side elevational view of my sliced bread dispenser, parts being shown in section;

FIG. 2 is a front elevational view thereof, with parts being broken away;

FIG. 3 is an isometric view of the loading trough for the loaf of bread; and

FIG. 4 is a vertical sectional view taken along the plane 4—4 of FIG. 2, and disclosing an insert filler plate for use in connection with thin slices of bread.

Description of the preferred embodiment

Referring now to the drawing in detail, I have shown a housing indicated generally at A, defining a compartment B for holidng a loaf of sliced bread C, with the slices 10 being stacked one above the other, the housing having a dispensing opening 11 in the front wall thereof through which one slice of bread at a time may be discharged.

It will be noted that the housing A has opposite side walls 12, each having a pair of spaced vertically extending movable resilient fingers 13 that have lower ends biased outwardly relative to their respective side wall (see FIG. 2). Each finger has a pin 14 fixed thereto and projecting inwardly with respect ot the compartment B (see FIGS. 1 and 2), these pins being located to engage with the second lower slice of bread 10a in the stack, when the fingers are pushed inwardly.

As disclosed in detail in FIGS. 1, 2 and 4, a swingable platform 15 is connected at its rear to the housing A and is positioned at the bottom of the compartment B so as to have the lowermost slice of bread 10b rest thereon, this platform being located so that the lowermost slice will slide through opening 11, when the platform is swung into a downwardly-inclined position, as shown by dot-dash lines in FIG. 1, this movement of the platform being suggested by the arrow 16. The platform 15 may be made from resilient material so as to permit this swinging movement, or a hinge and spring may be used.

A pair of rods 17 are disposed outwardly beyond the side walls 12 of the housing A and anchored at their lower ends to an operating plate or member 18, the latter being connected to the housing A and being movable into a downwardly-inclined position, as disclosed by dot-dash lines in FIG. 1. Again, the operating plate may be resilient, or hinged to the housing. Each of the rods 17 has a horizontal cross-bar 19 at its top, each cross-bar spanning across and contacting the adjacent pair of resilient fingers 13 on one side wall 12 of the housing A so as to push the fingers and their respective pins inwardly to temporarily engage with the second lower slice 10a of bread while the lowermost slice 10b is being discharged.

As shown in FIGS. 1, 2 and 4, a lost-motion means in the form of a catch 20 is provided on the operating plate 18 and engageable with the swingable platform 15 so as to swing the latter into a downwardly-inclined position to discharge the lowermost slice of bread 10b after the pins 14 have engaged with the second lower slice 10a.

In FIGS. 1 and 2, cover plates 21 are secured to the opposite side walls 12 of the housing A, such as by screws 22, thus forming a closure over the resilient fingers 13 and preventing air from passing between the spaced fingers into the compartment B. These cover plates have walls 23 located to hold the cross-bars 19 in sliding contact with the fingers 13 as the cross-bars are moved downwardly.

Referring to FIG. 4, I have illustrated an insert filler plate 24 that is removably mounted in the compartment B on the upper surface of the swingable platform 15 so as to hold a thin second lower slice of bread 10a' in an elevated position to be engaged by the pins 14 when the latter are pushed inwardly relative to the compartment, while the thin lowermost slice of bread 10b' is being discharged.

Moreover, a trough D has been provided to receive the loaf of sliced bread C, and this trough and slices of bread carried thereby is removably insertable in upright position into the compartment B (see FIGS. 1 and 2). Of course, the housing A may be placed flat on a table while the trough is being introduced into the compartment and thereafter the housing may be restored to upright position.

The trough D is substantially U-shaped in cross section, defining a pair of spaced side flanges 25 that are positionable adjacent to the opposite side walls 12 of the housing A, when the trough is inserted in upright position in the compartment B. These flanges have notches 26 in the lower end of the upright trough arranged to straddle the pins 14 on the fingers 13. In other words the pins 14 may pass through the notches 26 when the trough is fully inserted into the housing A.

Bottom wall 27 of the trough D will be adjacent to the rear wall 28 of the housing A, when the trough is inserted into the compartment B and the open front of this trough will face toward the front wall 29 of the housing, and thus the slices 10 of bread may pass one at a time to the dispensing opening 11.

A suitable cover 30 may be placed over the open top of the housing A, and FIG. 3 shows this cover as being fixed to the trough D. This will form a unitary structure, with the cover 30 providing an end wall for the trough.

In order to hold the insert filler plate 24 in place on the swingable platform 15, the former may have lugs 31 that project downwardly through openings 32 in the latter (see FIG. 4).

I claim:
1. In a sliced bread dispenser wherein the improvement comprises:
   (a) a housing defining a compartment for holding a loaf of sliced bread, with the slices being stacked one above the other, the housing having a dispensing opening in a wall thereof through which one slice of bread at a time may be discharged;
   (b) the housing having opposite side walls, each having a pair of spaced vertically-extending movable fingers thereon that have lower ends biased outwardly relative to their respective side wall;
   (c) each finger having a pin fixed to its lower end portion and projecting inwardly relative to the compartment, the pins being located to engage with the second lower slice of bread in the stack when the lower ends of the fingers are pushed inwardly;
   (d) a swingable platform connected to the housing and positioned at the bottom of the compartment so as to have the lowermost slice of bread rest thereon, this platform being located so that the lowermost slice will slide through the dispensing opening, when the platform is swung into a downwardly-inclined position;
   (e) a swingable operating member connected to the housing and being movable into a downward position;
   (f) a pair of rods disposed outwardly beyond the side walls of the housing and anchored at their lower ends to the operating member, and each of these rods having a horizontal cross-bar at its top, each cross-bar spanning across and contacting with the adjacent pair of movable fingers so as to push the lower ends of the fingers and their respective pins inwardly to temporarily engage with the second lower slice of bread while the lowermost slice of bread is being discharged.
2. The sliced bread dispenser, as set forth in claim 1;
   (g) and in which a lost-motion means is provided on the operating member and engageable with the swingable platform so as to swing the latter into a downwardly-inclined position as said member continues in downward movement to discharge the lowermost slice of bread after the pins have engaged with the second lower slice of bread.
3. The sliced bread dispenser, as set forth in claim 1;
   (g) and in which cover plates are secured to the opposite side walls of the housing to form a closure over the movable fingers and thus prevent air from passing between the spaced fingers into the compartment, these cover plates having inner walls located to bear against and hold the cross-bars in sliding contact with the fingers as the cross-bars are moved downwardly.

References Cited
UNITED STATES PATENTS

| | | | |
|---|---|---|---|
| 2,781,887 | 2/1957 | Forster | 221—242 X |
| 2,919,051 | 12/1959 | Wideburg et al. | 221—251 X |
| 2,974,828 | 3/1961 | Matteson | 221—251 X |
| 3,083,868 | 4/1963 | Mueller | 221—221 X |

STANLEY H. TOLLBERG, *Primary Examiner.*